(12) United States Patent
Hamanaka et al.

(10) Patent No.: US 8,873,645 B2
(45) Date of Patent: Oct. 28, 2014

(54) INFORMATION TRANSMISSION APPARATUS

(75) Inventors: Yoshiyuki Hamanaka, Kariya (JP);
Tsuneo Maebara, Nagoya (JP);
Takahiro Iwamura, Nishio (JP)

(73) Assignee: Denso Corporation, Kariya (JP)

( * ) Notice: Subject to any disclaimer, the term of this patent is extended or adjusted under 35 U.S.C. 154(b) by 305 days.

(21) Appl. No.: 13/431,245

(22) Filed: Mar. 27, 2012

(65) Prior Publication Data

US 2012/0249021 A1   Oct. 4, 2012

(30) Foreign Application Priority Data

Mar. 28, 2011   (JP) ................. 2011-070253

(51) Int. Cl.
*H04B 14/06* (2006.01)
*H02P 27/06* (2006.01)

(52) U.S. Cl.
CPC .................................... *H02P 27/06* (2013.01)
USPC ......................................................... 375/250

(58) Field of Classification Search
None
See application file for complete search history.

(56) References Cited

U.S. PATENT DOCUMENTS

| | | | | |
|---|---|---|---|---|
| 3,760,412 A * | 9/1973 | Barnes | ............................. | 341/53 |
| 4,185,273 A * | 1/1980 | Gowan | ............................. | 341/70 |
| 4,916,643 A * | 4/1990 | Ziegler et al. | ................. | 702/188 |
| 5,438,303 A * | 8/1995 | Murakami et al. | ............ | 332/109 |
| 5,640,160 A * | 6/1997 | Miwa | ............................... | 341/53 |
| 5,812,831 A * | 9/1998 | Crocker | ........................ | 713/500 |
| 6,198,766 B1 * | 3/2001 | Schuppe et al. | .............. | 375/239 |
| 6,208,280 B1 * | 3/2001 | Baker et al. | ..................... | 341/152 |
| 6,819,878 B1 * | 11/2004 | King et al. | ..................... | 398/189 |
| 6,831,702 B1 * | 12/2004 | Ueda | ............................. | 348/461 |
| 6,937,152 B2 * | 8/2005 | Small | .......................... | 340/568.1 |
| 7,804,378 B2 * | 9/2010 | Krause et al. | ................. | 332/109 |
| 8,000,051 B2 * | 8/2011 | Lloyd | .............................. | 360/51 |
| 8,295,407 B2 * | 10/2012 | Hsu et al. | ....................... | 375/340 |
| 2002/0084841 A1 * | 7/2002 | Taguchi et al. | ................ | 329/312 |
| 2002/0091961 A1 * | 7/2002 | Inoue | ............................. | 713/601 |

(Continued)

FOREIGN PATENT DOCUMENTS

| | | |
|---|---|---|
| JP | 62-222730 | 9/1987 |
| JP | 63-131627 | 6/1988 |

(Continued)

OTHER PUBLICATIONS

Office Action (1 page) dated Feb. 7, 2013, issued in corresponding Japanese Application No. 2011-070253 and English translation (1 page).

*Primary Examiner* — Santiago Garcia
(74) *Attorney, Agent, or Firm* — Nixon & Vanderhye PC

(57) ABSTRACT

A transmission circuit transmits a header pulse signal which has signal length being equal to or more than twice as long as reference time, pulse period having predetermined ratio thereof to the signal length, and pulse stop period being successive and longer than the reference time via transmission path. The transmission circuit subsequently and successively transmits a plurality of data pulse signals which have signal length being the same as the reference time, pulse period having predetermined ratio thereof to the signal length associated with data, and pulse stop period being located before and after the pulse period via the transmission path. A reception circuit receives pulse signals via the transmission path, detects the header pulse signal based on the pulse stop period of the received pulse signal, and obtains a plurality of pieces of data based on the pulse period of pulse signals following the header pulse signal.

20 Claims, 4 Drawing Sheets

(56) References Cited

U.S. PATENT DOCUMENTS

| | | | |
|---|---|---|---|
| 2005/0204246 A1* | 9/2005 | Sakai | 714/744 |
| 2005/0264350 A1* | 12/2005 | Lee et al. | 330/10 |
| 2006/0055483 A1* | 3/2006 | Berger et al. | 332/109 |
| 2007/0177321 A1* | 8/2007 | Weiberle et al. | 361/93.1 |
| 2008/0258777 A1* | 10/2008 | Faust et al. | 327/105 |
| 2009/0292936 A1* | 11/2009 | Hayakawa et al. | 713/330 |
| 2010/0106041 A1* | 4/2010 | Ghovanloo et al. | 600/544 |
| 2010/0117752 A1* | 5/2010 | Iozsef et al. | 332/109 |
| 2010/0242481 A1* | 9/2010 | Shamoto et al. | 60/698 |
| 2010/0270964 A1* | 10/2010 | Lazar et al. | 318/503 |
| 2011/0062934 A1* | 3/2011 | Wolf et al. | 323/304 |
| 2011/0127986 A1* | 6/2011 | Almquist et al. | 323/304 |
| 2011/0176589 A1* | 7/2011 | Kolof et al. | 375/224 |
| 2011/0254520 A1* | 10/2011 | Teh et al. | 323/272 |
| 2011/0310954 A1* | 12/2011 | Sawaoka et al. | 375/238 |
| 2011/0316731 A1* | 12/2011 | Scheytt | 341/143 |
| 2013/0234769 A1* | 9/2013 | Senda | 327/175 |
| 2013/0258735 A1* | 10/2013 | Damson et al. | 363/131 |

FOREIGN PATENT DOCUMENTS

| | | | | |
|---|---|---|---|---|
| JP | 05-292042 | | 11/1993 | |
| JP | 5-316574 | | 11/1993 | |
| JP | 6-284100 | | 10/1994 | |
| JP | H06-284100 A | * | 10/1994 | ............... H04J 3/00 |
| JP | 2006-079404 | | 3/2006 | |
| JP | 2009-171312 | | 7/2009 | |
| JP | 2011-167038 | | 8/2011 | |
| JP | 2011-167039 | | 8/2011 | |

* cited by examiner

INFORMATION TRANSMISSION APPARATUS

CROSS-REFERENCE TO RELATED APPLICATION

This application is based on and claims the benefit of priority from earlier Japanese Patent Application No. 2011-070253 filed Mar. 28, 2011, the description of which is incorporated herein by reference.

BACKGROUND OF THE INVENTION

1. Technical Field of the Invention

The present invention relates to an information transmission apparatus that transmits information, and in particular, to an information transmission apparatus that transmits a plurality of pieces of data associated with a motor control apparatus.

2. Related Art

As an information transmission apparatus that transmits information, for example, JP-A-2009-171312 discloses an on-board information transmission apparatus.

The on-board information transmission apparatus is an apparatus for transmitting temperature information detected by a temperature sense diode. The apparatus includes a frequency modulation circuit, a photo coupler, and a microcomputer. In the apparatus, the temperature sense diode senses temperature and outputs the corresponding voltage. The frequency modulation circuit produces frequency-modulated signals associated with the outputted voltage. The microcomputer receives the frequency-modulated signal via the photo coupler and demodulates them, thereby obtaining the temperature information sensed by the temperature sense diode.

In the case where a plurality of pieces of temperature information are transmitted, the above on-board information transmission apparatus is needed to be provided with the frequency modulation circuit and the photo coupler for each piece of temperature information to be transmitted. Therefore, an issue occurs in that the circuit configuration becomes complicated and an increase in cost is caused.

SUMMARY

The present disclosure has been made in light of the issues set forth above and provides an information transmission apparatus capable of reliably transmitting a plurality of pieces of data with a simple configuration.

As a result of devoting efforts to a study of solving the problems through a process of trial and error, the inventors have found that a configuration of a header pulse signal and a plurality of data pulse signals is devised to be able to reliably transmit a plurality of pieces of data with a simple configuration, and then have come to complete the present disclosure.

According to an exemplary aspect of the present disclosure, there is provided an information transmission apparatus, comprising: a transmission circuit that transmits, via a transmission path, a header pulse signal which has a signal length being equal to or more than twice as long as a reference time, a pulse period having a predetermined ratio thereof to the signal length, and a pulse stop period being successive to the pulse period and longer than the reference time, and that subsequently transmits, via the transmission path, successively a plurality of data pulse signals which have a signal length being the same as the reference time, a pulse period having a predetermined ratio thereof to the signal length associated with data, and a pulse stop period being located before and after the pulse period; and a reception circuit that receives pulse signals transmitted from the transmission circuit via the transmission path, which detects the header pulse signal based on the pulse stop period of the received pulse signal, and which obtains a plurality of pieces of data based on the pulse period of pulse signals following the header pulse signal.

According to the configuration, the data pulse signal has the signal length which is the same as the reference time, and has the pulse period and the pulse stop period. The header pulse signal has the signal length that is equal to or more than twice as long as the reference time, and has the pulse stop that is successive to the pulse period and longer than the reference time which is not predicted in the data pulse signal. Due to this, the header pulse signal can be identified based on the pulse stop period. Thus, pulse signals following the header pulse signal can be identified as the data pulse signal. The data pulse signal has the pulse period associated with data, and has the pulse stop period being located before and after the pulse period. Due to this, even if a plurality of data pulse signals are successively transmitted, the pulse periods are not successive to each other. This enables the pulse period to be identified for each data pulse signal. Thus, a plurality of pieces of data can be obtained based on the pulse period of pulse signals following the header pulse signal. In this way, a plurality of pieces of data can be transmitted and received via the single signal line. Therefore, compared with the related art, a circuit is not needed to be provided for each piece of data, and then, a plurality of pieces of data can be reliably transmitted with a simple configuration.

In the information transmission apparatus, the reception circuit may obtain the reference time based on the pulse period of the header pulse signal, and obtain the plurality of pieces of data based on the obtained reference time and the pulse period of pulse signals following the header pulse signal. According to the configuration, even if the reference time varies due to a change in characteristics of, e.g., a circuit, the reference time can be obtained with accuracy. Therefore, a plurality of pieces of data can be precisely obtained without being affected by the influence of variation.

In the information transmission apparatus, the transmission circuit may transmit the header pulse signal as signals having a pulse period that is equal to or more than one-half as long as the reference time, the reception circuit may include a microcomputer that repeats a control process to control a controlled target for each control cycle, the reference time may be set to be twice as long as the control cycle. The microcomputer may include a measurement unit that measures the pulse period and the pulse stop period, a pulse period storage unit that store value of the pulse period measured by measurement unit for each measurement, a pulse stop period storage unit that store value of the pulse stop period measured by measurement unit for each measurement, and the microcomputer reads the value of the pulse period stored in the pulse period storage unit and the value of the pulse stop period stored in the pulse stop period storage unit, which detects the header pulse signal based on the read values of the pulse period and the pulse stop period, and which obtains the plurality of pieces of data based on the identified header pulse signal.

According to the configuration, the value of the pulse period stored in the pulse period storage unit is held therein during a period from completion of the present measurement of the pulse period to completion of the next measurement thereof. The value of the pulse stop period stored in the pulse stop period storage unit is held therein during a period from completion of the present measurement of the pulse stop period to completion of the next measurement thereof. The period from completion of the present measurement of the pulse period to completion of the next measurement thereof and the period from completion of the present measurement of the pulse stop period to completion of the next measurement thereof become more than one-half as long as the reference time. That is, the period during which the pulse period and the pulse stop period are held is more than one-half as long as the reference time. Here, the reference time is set to a time which is equal to or more than twice as long as the control cycle. In other words, the control cycle is set to a time which is equal to or less than one-half as long as the reference time. Thus, values of the pulse period and the pulse stop period are read for each control cycle which is shorter than the period during which the pulse period and the pulse stop period are held. Due to this, the values of the pulse period and the pulse stop period can be read precisely without being skipped. Therefore, a plurality of pieces of data can be obtained without affecting the control process as in the case of interrupts for reading contents stored in the storage unit.

In the information transmission apparatus, the microcomputer may read the value of the pulse period of the header pulse signal stored in the pulse period storage unit, obtain the reference time based on the read value of the pulse period, and obtain the plurality of pieces of data based on the obtained reference time and the value of the pulse period of pulse signals following the header pulse signal stored in the pulse period storage unit. According to the configuration, even if the reference time varies due to a change in characteristics of, e.g., a circuit, the reference time can be obtained with accuracy. Therefore, a plurality of pieces of data can be precisely obtained without being affected by the influence of variation.

In the information transmission apparatus, the transmission circuit may transmit the data pulse signal as signals having the pulse period that is symmetrical with respect to a temporal center of the signal length. According to the configuration, the pulse stop period can be located before and after the pulse period with certainty.

In the information transmission apparatus, the reception circuit may judge that disconnection with the transmission circuit occurs if state of pulse signals continues to be unchanged for a predetermined time or more. According to the configuration, disconnection with the transmission circuit can be reliably detected.

In the information transmission apparatus, the plurality of pieces of data may be data associated with a motor control apparatus. According to the configuration, the plurality of pieces of information related to a motor control apparatus can be properly transmitted with a simple configuration.

DETAILED DESCRIPTION OF THE PREFERRED EMBODIMENTS

Hereinafter, with reference to the drawings, an exemplary embodiment of the present invention will be described. In the embodiment, an information transmission apparatus according to the present invention is applied to a motor control apparatus which is mounted on a vehicle and controls a motor for driving the vehicle.

Figure 1:
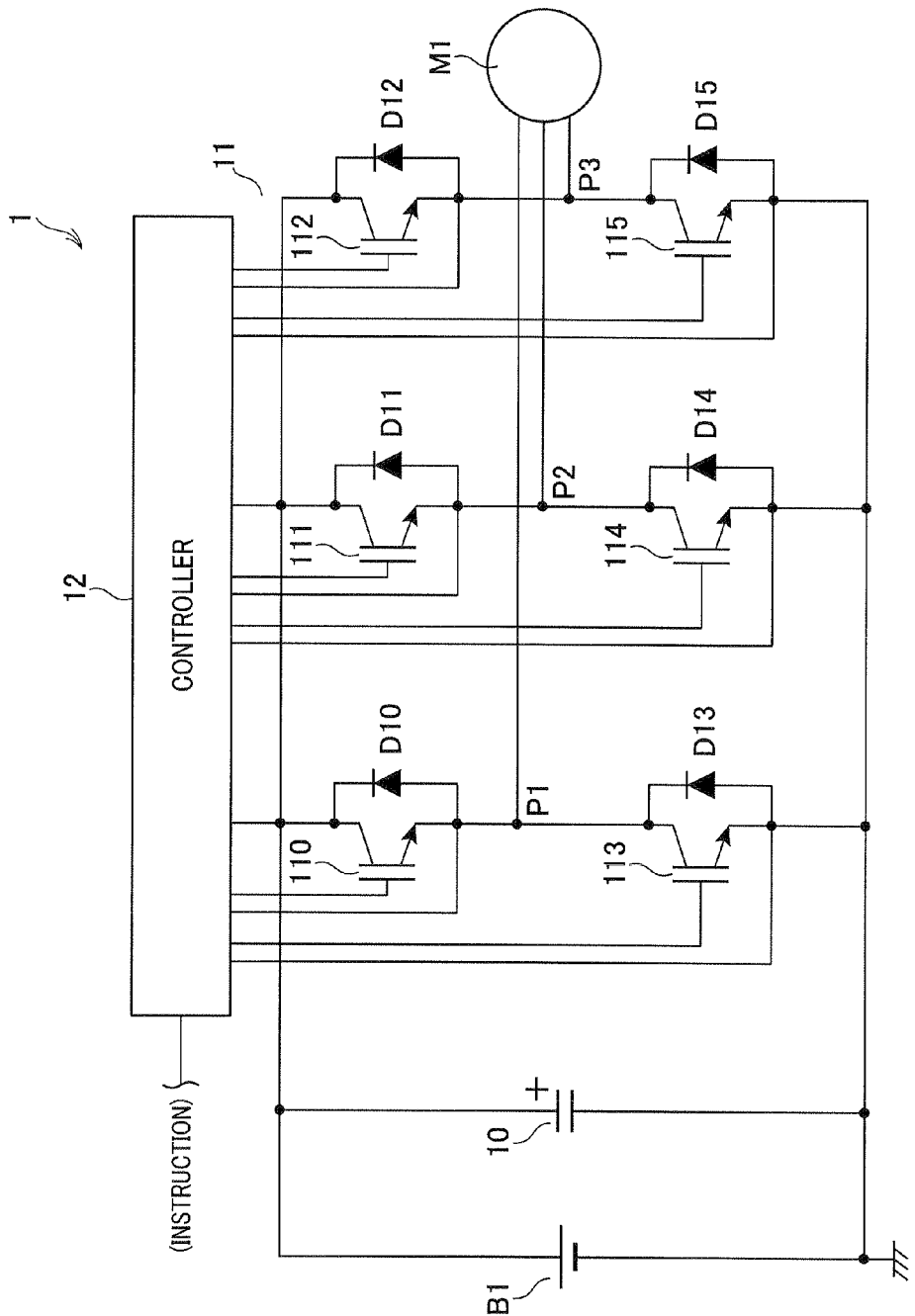
FIG. 1 is a circuit diagram of a configuration of a motor control apparatus to which an exemplary embodiment of the present invention is applied.

With reference to FIG. 1, a configuration of a motor control apparatus according to the present embodiment will be described below. FIG. 1 shows a circuit diagram of the motor control apparatus according to the present embodiment.

As shown in FIG. 1, a motor control apparatus 1 is an apparatus that converts a direct current (DC) high voltage (e.g., 288 V) outputted from a high voltage battery B1, which is insulated from a body of a vehicle, to a three-phase alternating current (AC) voltage, and supplies the converted three-phase AC voltage to a vehicle drive motor M1 in such a manner that the motor M1 is controlled. The motor control apparatus 1 includes a smoothing capacitor 10, an inverter 11, and a controller 12.

The smoothing capacitor 10 is an element that smoothes the DC high voltage from the high voltage battery B1. One end of the smoothing capacitor 10 is connected to a positive terminal of the high voltage battery B1, and the other end is connected to a negative terminal of the high voltage battery B1, which is connected to a ground for the high voltage battery B1 insulated from the body of the vehicle.

The inverter 11 is a device that converts the DC high voltage smoothed by the smoothing capacitor 10 to three-phase AC voltage and supplies the converted three-phase AC voltage to the vehicle drive motor M1. The inverter 11 includes insulated gate bipolar transistors (IGBTs) 110 to 115.

The IGBTs 110 to 115 are a switching element that is driven by controlling gate voltage and is turned on and off so that the DC high voltage smoothed by the smoothing capacitor 10 is converted to the three-phase AC voltage. Both of the IGBTs 110 and 113 are connected in series to each other, both of the IGBTs 111 and 114 are connected in series to each other, and both of the IGBTs 112 and 115 are connected in series to each other. The emitters of the IGBTs 110 to 112 are connected to the collectors of the IGBT 113 to 115. Three sets of series connections, i.e., the IGBTs 110 and 113, the IGBTs 111 and 114, and the IGBTs 112 and 115 are connected in parallel to one another. The collectors of the respective IGBTs 110 to 112 are connected to one end of the smoothing capacitor 10, and the emitters of the respective IGBTs 113 to 115 are connected to the other end of the smoothing capacitor 10. The gates and emitters of the respective IGBTs 110 to 115 are connected to the controller 12. Three series connection points P1 to P3 between the IGBTs 110 and 113, the IGBTs 111 and 114, and the IGBTs 112 and 115 respectively are connected to the vehicle drive motor M1. In the respective IGBTs 110 to 115, diodes (i.e., free wheel diodes) D10 to D15 are connected in anti-parallel, respectively.

The controller 12 is a device that controls the IGBTs 110 to 115. The controller 12 is connected to the gates and emitters of the IGBTs 110 to 115.

Figure 2:
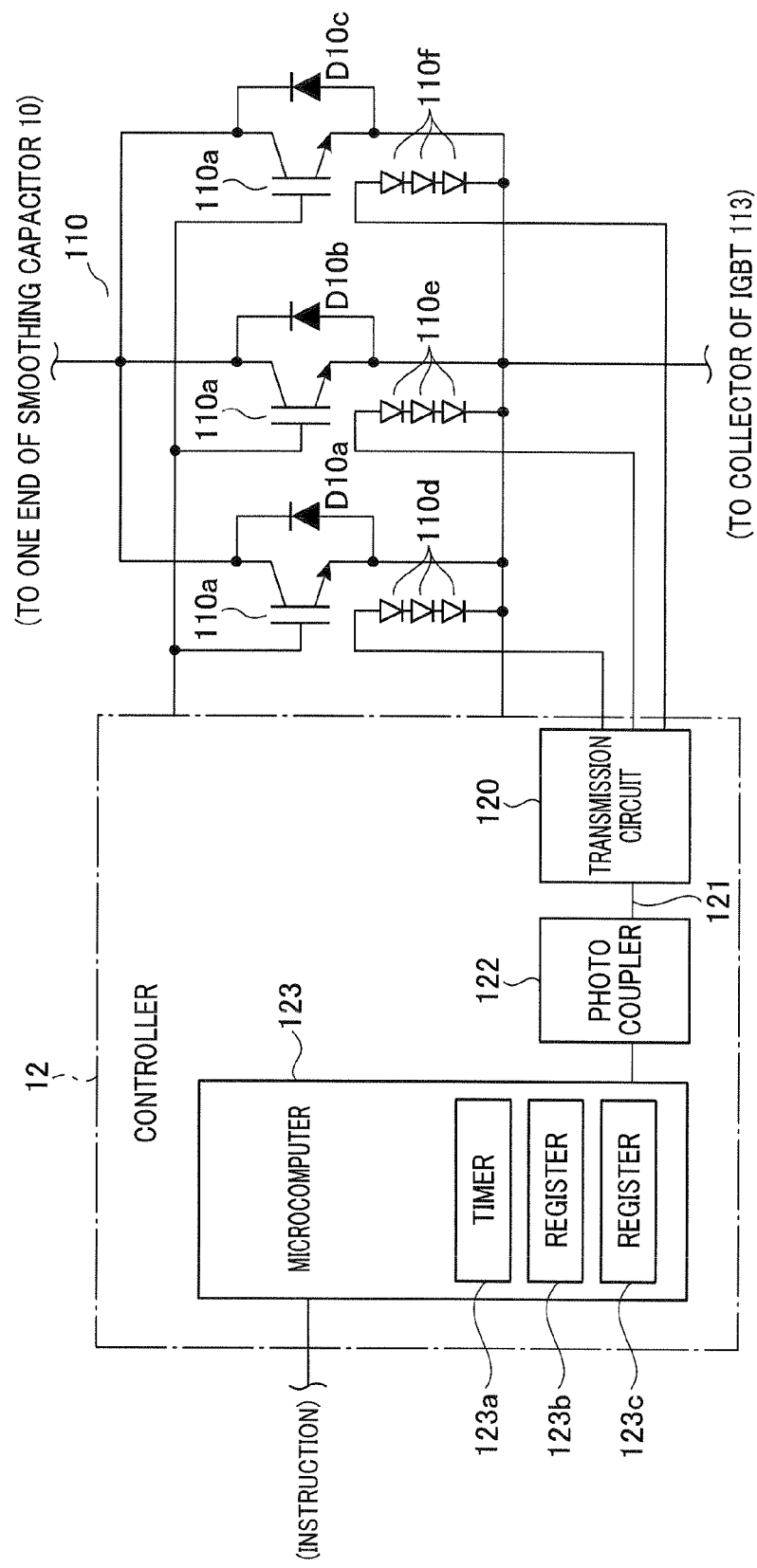
FIG. 2 is a circuit diagram of an insulated gate bipolar transistor (IGBT) and a control apparatus shown in FIG. 1.

With reference to FIG. 2, the IGBTs and the controller are described in detail. FIG. 2 shows a circuit diagram of the IGBTs and the controller shown in FIG. 1, and particularly shows a circuit part of the controller with respect to one IGBT (the IGBT 110 in FIG. 1).

As shown in FIG. 2, the IGBT 110 includes small current capacity IGBTs 110a to 110c and current sense resistors 111d to 111f. The IGBTs 110a to 110c are connected in parallel with one another, and specifically, their gates are connected to one another, their collectors are connected to one another, and their emitters are connected to one another. As the gate of the IGBT 110, the gate of the respective IGBTs 110a to 110c is connected to the controller 12. As the collector of the IGBT 110, the collector of the respective IGBTs 110a to 110c is connected to one end of the smoothing capacitor 10. As the emitter of the IGBT 110, the emitter of the respective IGBTs 110a to 110c is connected to the controller 12. The other IGBTs 111 to 115 have the same configuration as the IGBT 110.

The temperature sensitive diodes 110d to 110f are an element that detects temperatures of the IGBTs 110a to 110c, and particularly output voltage based on temperature by applying constant current. The respective temperature sensitive diodes 110d to 110f are configured to be integrated with the respective IGBTs 110a to 110c, and have series-connected diodes (e.g., three diodes in FIG. 1). The anode on one end of series-connected diodes of the respective temperature sensitive diodes 110d to 110f is connected to the controller 12, and the cathode on the other end thereof is connected to the respective emitter of the IGBTs 110a to 110c.

As for the IGBT 110, the controller 12 includes a transmission circuit 120, a signal line 121 (transmission path), and a photo coupler 122. As for the other respective IGBTs 111 to 115, the controller 12 also includes the same transmission circuit, signal line, and photo coupler (not shown). The controller 12 includes a microcomputer 123 (reception circuit) for the IGBTs 110 to 115.

The transmission circuit 120 is a circuit that transmits, as pulse signals, a plurality of pieces of data associated with detection results of the temperature sense diodes 110d to 110f via a single signal line 121. Specifically, the transmission circuit 120 transmits a header pulse signal which has a signal length, a pulse period, and a pulse stop period, where the signal length is twice as long as a reference time, the pulse period has a predetermined ratio thereof to the signal length, e.g., one-half as long as the signal length, and the pulse stop period is successive and is longer than the reference time. Subsequently, the transmission circuit 120 transmits successively a plurality of data pulse signals which have a signal length, a pulse period and a pulse stop period, where the signal length is the reference time, the pulse period is symmetrical with respect to a temporal center of the signal length and has a predetermined ratio thereof to the signal length associated with data, and the pulse stop period lies before and after the pulse period. Here, the reference time is set to be twice as long as a control cycle of the microcomputer 123 as explained below. The input terminal of the transmission circuit 120 is connected to the anode on one end of series-connected diodes of the respective temperature sense diode 110d to 110f, and the output terminal thereof is connected to the microcomputer 123 via the signal line 121 and the photo coupler 122.

The microcomputer 123 is an element that repeats a control process for each control cycle based on an externally-inputted command and outputs, to a drive circuit (not shown), drive signals for controlling the IGBTs 110 to 115 (control targets). The microcomputer 123 also is an element that receives pulse signals transmitted from the transmission circuit 120 via the single signal line 121 and obtains a plurality of pieces of data associated with detection results of the temperature sense diodes 110d to 110f based on the received pulse signals. Specifically, the microcomputer 123 receives pulse signals transmitted from the transmission circuit 120 via the single signal line 121, detects the header pulse signal based on the pulse stop period of the received pulse signal, and obtains a plurality of pieces of data associated with detection results of the temperature sense diodes 110d to 110f based on the pulse period of pulse signals following the header pulse signal. More specifically, the microcomputer 123 obtains a reference time from the pulse period of the header pulse signal, and obtains a plurality of pieces of data based on the obtained reference time and the pulse period of pulse signals following the header pulse signal. The microcomputer 123 judges whether or not overheat of the IGBT 110 occurs based on the obtained the plurality of pieces of data. The microcomputer 123 also judges that, if state of pulse signals continues to be unchanged for a predetermined time or more, disconnection with the transmission circuit 120 occurs. If it is judged that overheat and disconnection occur, the microcomputer 123 performs the corresponding process. The input terminal of the microcomputer 123 is connected to the output terminal of the transmission circuit 120 via the signal line 121 and the photo coupler 122.

The microcomputer 123 includes a timer (measurement unit), a pulse period storage register 123b (pulse period storage unit), and a pulse stop period storage register 123c (pulse stop period storage unit).

The timer 123a is a block (element) that operates independently of the control process, and measures sequentially the pulse period and the pulse stop period based on a rising edge and falling edge of the received pulse signals.

The pulse period storage register 123b is a block (element) that operates independently of the control process, and stores the value of the pulse period each time the timer 123a completes measurement of the pulse period.

The pulse stop period storage register 123c is a block (element) that operates independently of the control process, and stores the value of the pulse stop period each time the timer 123a completes measurement of the pulse stop period.

The microcomputer 123 reads the value of the pulse period stored in the pulse period storage register 123b and the value of the pulse stop period stored in the pulse stop period storage register 123c for each control cycle, detects the header pulse signal based on the read values of the pulse period and the pulse stop period, and obtains a plurality of pieces of data. Specifically, the microcomputer 123 reads the pulse period of the header pulse signal from the pulse period storage register 123b, obtains the reference time based on the read value of the pulse period, and obtains a plurality of pieces of data based on the obtained reference time and the value of the pulse period of pulse signals following the header pulse signal which is stored in the pulse period storage register 123b.

With reference to FIG. 1, an operation of the motor control apparatus is described. When an ignition switch (not shown) of the vehicle is turned on, the motor control apparatus 1 starts to operate. A DC high voltage from the high voltage battery B1 is smoothed by the smoothing capacitor 10. The IGBTs 110 to 115 of the inverter 11 is controlled by the controller 12 based on instructions (commands) inputted from the outside. And then, the IGBTs 110 to 115 are turned on and off at a predetermined cycle. The DC high voltage smoothed by the smoothing capacitor 10 is converted by the inverter 11 into a three-phase AC voltage and supplies the three-phase AC voltage converted to the vehicle drive motor M1. Thus, the vehicle drive motor M1 is controlled by the motor control apparatus 1.

Figure 3:
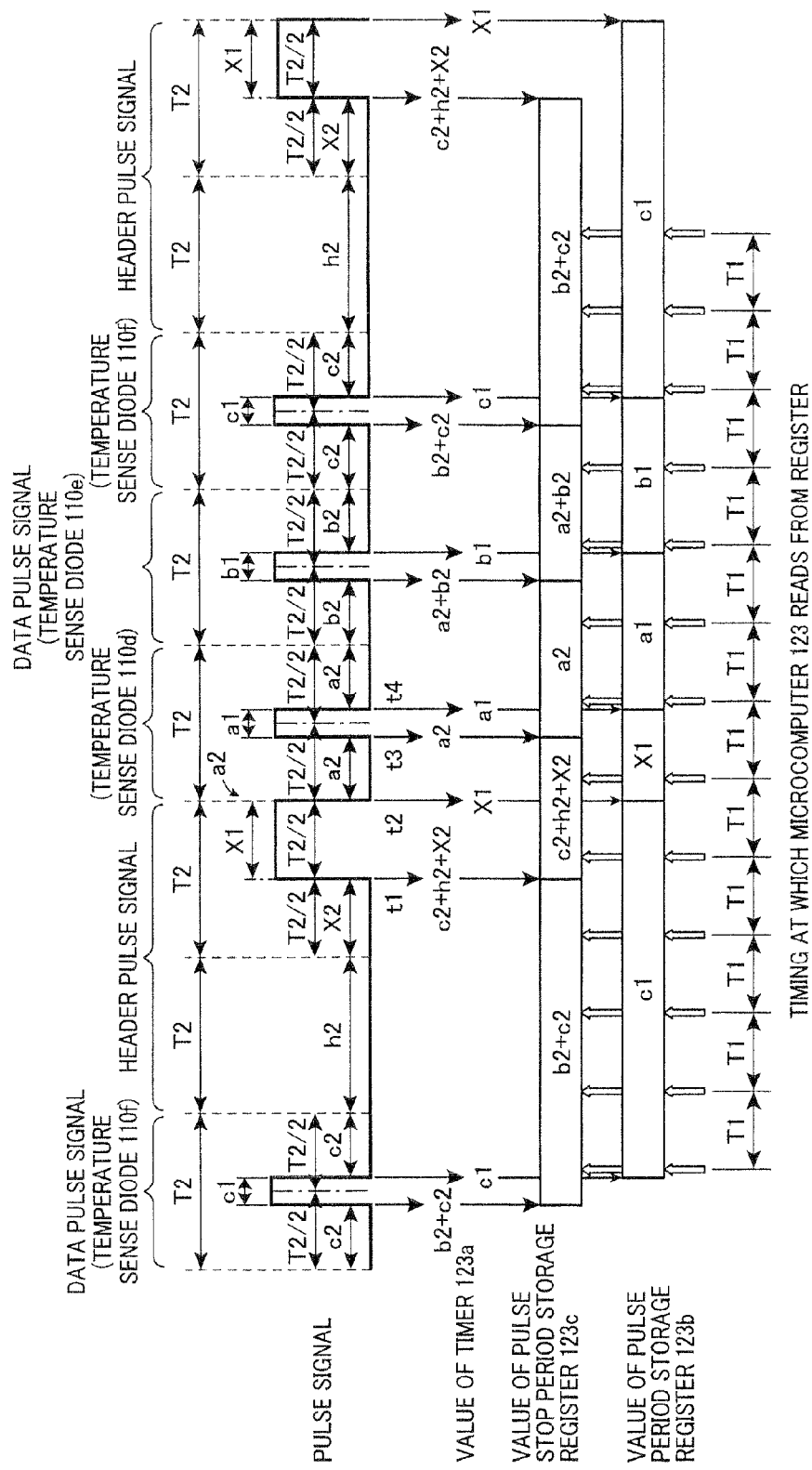
FIG. 3 is a timing chart for showing an operation to obtain data from pulse signals according to the present embodiment.

With reference to FIGS. 2 and 3, an operation to obtain data from pulse signals. FIG. 3 shows a timing chart for explaining the operation to obtain data from pulse signals.

As shown in FIG. 3, the transmission circuit 120 in FIG. 2 transmits a header pulse signal which has (i) a signal length being twice as long as a reference time T2, (ii) a pulse period X1 being one-half as long as the reference time T2, and (iii) a pulse stop period (h2+X2) being 3/2 times as long as the reference time T2. Subsequently, the transmission circuit 120 transmits successively a plurality of data pulse signals which have (iv) a signal length being the reference time T2, (v) a pulse period (a1, b1, c1) being symmetrical with respect to a temporal center of the signal length and having a predetermined ratio thereof to the signal length associated with data, and (v1) a pulse stop period (a2, b2, c2) being located before and after the pulse period (a1, b1, c1). Here, the reference time T2 is set to be twice as long as a control cycle T1 of the microcomputer 123.

The microcomputer 123 in FIG. 2 receives pulse signals transmitted from the transmission circuit 120 via the signal line 121 and the photo coupler 122.

The timer 123a of the microcomputer 123 operates independently of the control process of the microcomputer 123 and sequentially measures the pulse period and the pulse stop period based on a rising edge and falling edge of the received pulse signals. Specifically, the timer 123a starts measurement of the pulse period at the rising edge and completes the measurement of the pulse period at the subsequent falling edge. The timer 123a starts measurement of the pulse stop period at the falling edge and completes the measurement of the pulse period at the subsequent rising edge.

The pulse period storage register 123b and the pulse stop period storage register 123c of the microcomputer 123 operate independently of the control process of the microcomputer 123 and store values of the pulse period and the pulse stop period measured by the timer 123a in synchronization with the rising edge and falling edge of the pulse signals. Specifically, the pulse period storage register 123b stores the value of the pulse period in synchronization with the falling edge and holds it until the subsequent rising edge. The pulse stop period storage register 123c stores the value of the pulse stop period in synchronization with the rising edge and holds it until the subsequent falling edge.

As shown in FIG. 3, the timer 123a starts measurement of the pulse stop period (c2+h2+x2) of the header pulse signal at time t0 being the falling edge of pulse signals, and completes the measurement at time t1 being the subsequent rising edge. The pulse stop period storage register 123c stores value of the pulse stop period (c2+h2+x2) measured by the timer 123a in synchronization with time t1 being the rising edge, and holds it until time t3 being the subsequent rising edge.

Subsequently, the timer 123a starts measurement of the pulse period (X1) of the header pulse signal at time t1 being the rising edge of pulse signals, and completes the measurement at time t2 being the subsequent falling edge. The pulse period storage register 123b stores value of the pulse period (X1) measured by the timer 123a in synchronization with time t2 being the falling edge, and holds it until time t4 being the subsequent falling edge.

Since then, in a similar way, the timer 123a sequentially measures the pulse period (a1, b1, c1) and the pulse stop period (a2, a2+b2, b2+c2). The pulse period storage register 123b stores value of the pulse period (a1, b1, c1) measured by the timer 123a in synchronization with the falling edge, and holds it until the subsequent falling edge. The pulse stop period storage register 123c stores value of the pulse stop period (a2, a2+b2, b2+c2) measured by the timer 123a in synchronization with the rising edge, and holds it until the subsequent rising edge.

The microcomputer 123 reads the value of the pulse period stored in the pulse period storage register 123b and the value of the pulse stop period stored in the pulse stop period storage register 123c for each control cycle, and detects the header pulse signal based on the read values of the pulse period and the pulse stop period. Specifically, if the read value of the pulse period is longer than the reference time T2, the microcomputer 123 detects the header pulse signal. More particularly, if the read value of the pulse period equals to value of pulse period (c2+h2+X2) which is longer than the reference time T2, the microcomputer 123 detects the header pulse signal. Subsequently, the microcomputer 123 obtains correct reference time T2 based on the read value of the pulse period (X1) of the header pulse signal. Specifically, the microcomputer 123 obtains the correct reference time T2 by doubling the read value of the pulse period (X1). Subsequently, the microcomputer 123 obtains a plurality of pieces of data associated with detection results of the temperature sense diodes 110d to 110f based on the obtained reference time T2 and the value of the pulse period (a1, b1, c1) of pulse signals following the read header pulse signal. Specifically, the microcomputer 123 obtains a plurality of pieces of data as a ratio of the pulse period (a1, b1, c1) to the reference time T2, i.e., duty ratio that is obtained by dividing the read value of the pulse period (a1, b1, c1) by the obtained reference time T2.

The microcomputer 123 also judges that, if state of pulse signals continues to be unchanged for a predetermined time or more, disconnection with the transmission circuit 120 occurs. If it is judged that disconnection occurs, the microcomputer 123 performs the corresponding process.

Figure 4:
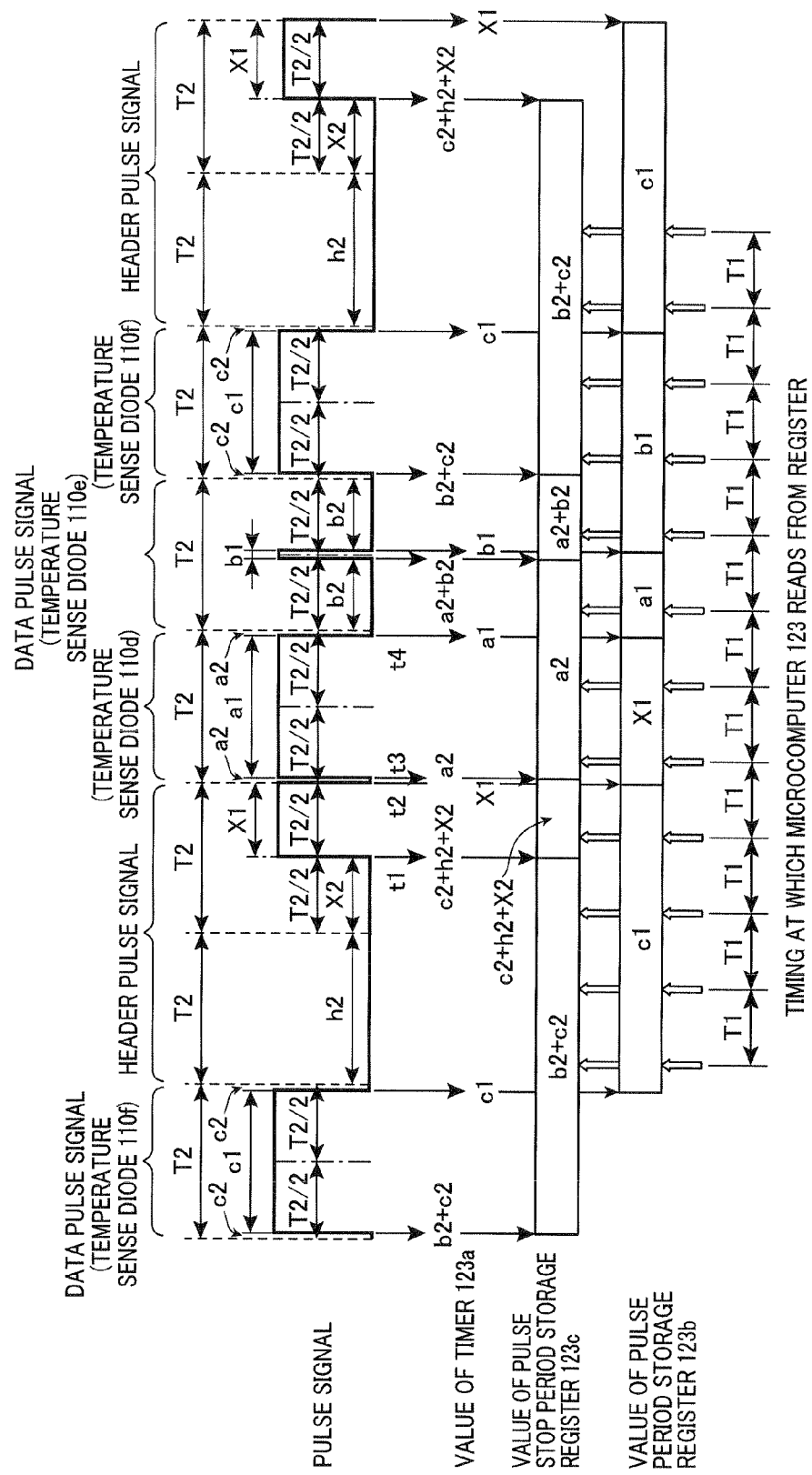
FIG. 4 is a timing chart for showing an operation to obtain data from pulse signals when a detection result of a temperature sense diode is changed, according to the present embodiment.

If the result detection of the temperature sense diode varies, the pulse period of the data pulse signal varies. For example, as shown in FIG. 4, if a pulse period of the respective data pulse signals associated with the respective temperature sense diodes 110d and 110f becomes longer and a pulse period of the data pulse signal associated with the temperature sense diodes 110e becomes shorter, a period during which the pulse period (a1) is held in the pulse period storage register 123b and a period during which the pulse stop period (c2+h2+X2) is held in the pulse stop period storage register 123c become shorter, compared with FIG. 3.

The value of the pulse period stored in the pulse period storage register 123b is held therein during a period from completion of the present measurement of the pulse period to completion of the next measurement thereof. The value of the pulse stop period stored in the pulse stop period storage register 123c is held therein during a period from completion of the present measurement of the pulse stop period to completion of the next measurement thereof. The period from completion of the present measurement of the pulse period to completion of the next measurement thereof and the period from completion of the present measurement of the pulse stop period to completion of the next measurement thereof become more than one-half as long as the reference time. That is, the period during which the pulse period and the pulse stop period are held is more than one-half as long as the reference time T2. Here, the reference time T2 is set to a time which is twice as long as the control cycle T1. In other words, the control cycle T1 is set to a time which is one-half as long as the reference time T2. Thus, values of the pulse period and the pulse stop period are read for each control cycle T1 which is shorter than the period during which the pulse period and the pulse stop period are held. Due to this, even if the pulse period of the data pulse signal is changed, the values of the pulse period and the pulse stop period can be read precisely without being skipped. This enables a plurality of pieces of data to be obtained.

The effects of the present embodiment are described below. According to the present embodiment, the data pulse signal has the signal length being the reference time T2, the pulse period and the pulse stop period. The header pulse signal has the signal length being twice as long as the reference time T2, and has the pulse stop period (c2+h2+X2) that is successive and is longer than the reference time, which is not predicted in the data pulse signal. This enables the header pulse signal to be indentified based on the pulse stop period. Thus, pulse signals following the header pulse signal can be identified as the data pulse signal. The data pulse signal has the pulse period associated with data, and has the pulse stop period being located before and after the pulse period. Due to this, even if a plurality of data pulse signals are successively transmitted, the respective pulse period is not successive. This enables the pulse period to be identified for each data pulse signal. Thus, a plurality of pieces of data can be obtained based on the pulse period of pulse signals following the header pulse signal. In this way, a plurality of pieces of data can be transmitted and received via the single signal line 121. Therefore, compared with the related art, a circuit is not needed to be provided for each piece of data, and then, a plurality of pieces of data associated with the temperature sense diodes 110d to 110f of the motor control apparatus 1 can be reliably transmitted with a simple configuration.

According to the present embodiment, as explained above, the values of the pulse period and the pulse stop period are read for each control cycle T1, and then, the values of the pulse period and the pulse stop period can be read precisely without being skipped. For example, the control process may be affected by the influence of interrupts for reading contents stored in the pulse period storage register 123b and the pulse stop period storage register 123c, but in the present embodiment, a plurality of pieces of data can be obtained without affecting the control process as in the case of interrupts.

According to the present embodiment, the reference time T2 is obtained based on the pulse period (X1) of the header pulse signal. Thus, even if the reference time T2 varies due to a change in characteristics of, e.g., a circuit, the reference time T2 can be obtained with accuracy. Therefore, a plurality of pieces of data can be precisely obtained without being affected by the influence of variation.

According to the present embodiment, the transmission circuit 120 transmits the data pulse signal as pulse signals having the pulse period that is symmetrical with respect to a temporal center of the signal length. Due to this, the pulse stop period can be located before and after the pulse period with certainty.

According to the present embodiment, the microcomputer 123 judges that, if state of pulse signals continues to be unchanged for a predetermined time or more, disconnection with the transmission circuit 120 occurs. Thus, disconnection from the transmission circuit 120 can be reliably detected.

The present embodiment explains an example of the signal length of the header pulse signal being twice as long as the reference time T2. The present embodiment is not limited to it. For example, the signal length of the header pulse signal may be more than twice as long as the reference time T2. This signal length may be equal to or more than twice as long as T2.

The present embodiment explains an example of the pulse period of the header pulse signal being one-half as long as the reference time T2. The present embodiment is not limited to it. For example, the pulse period of the header pulse signal may be longer than one-half as long as the reference time T2. This pulse period may be equal to or more than one-half as long as T2.

The present embodiment explains an example of the reference time T2 being twice as long as the control cycle T1. The present embodiment is not limited to it. For example, the reference time T2 may be more than twice as long as the control cycle T1. That is, T2 may be equal to or more than twice as long as T1.

The present embodiment explains an example of the pulse period being high level and the pulse stop period being low level. The present embodiment is not limited to it. For example, the pulse period may be low level, and the pulse stop period may be high level.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An information transmission apparatus, comprising:
a transmission circuit that transmits, via a transmission path, a header pulse signal which has a signal length being equal to or more than twice as long as a reference time, a pulse period having a predetermined ratio thereof to the signal length, and a pulse stop period being successive to the pulse period and longer than the reference time, and that subsequently and successively transmits, via the transmission path, a plurality of data pulse signals which have a signal length being the same as the reference time, a pulse period having a predetermined ratio thereof to the signal length associated with data, and a pulse stop period being located before and after the pulse period; and
a reception circuit that receives pulse signals transmitted from the transmission circuit via the transmission path, which detects the header pulse signal based on the pulse stop period of the received pulse signal, and which obtains a plurality of pieces of data based on the pulse period of pulse signals following the header pulse signal,
wherein the pulse stop period of the header pulse signal transmitted by the transmission circuit is longer than the pulse stop period of each of the data pulse signals transmitted by the transmission circuit.

2. The information transmission apparatus according to claim 1, wherein
the reception circuit obtains the reference time based on the pulse period of the header pulse signal, and obtains the plurality of pieces of data based on the obtained reference time and the pulse period of pulse signals following the header pulse signal.

3. The information transmission apparatus according to claim 1, wherein:
the transmission circuit transmits the header pulse signal as signals having a pulse period that is equal to or more than one-half as long as the reference time;
the reception circuit includes a microcomputer that repeats a control process to control a controlled target for each control cycle;
the reference time is set to be twice as long as the control cycle, and
the microcomputer includes a measurement unit, a pulse period storage unit, and a pulse stop period storage unit;
the measurement unit measures the pulse period and the pulse stop period,
the pulse period storage unit stores a value of the pulse period measured by measurement unit for each measurement;

the pulse stop period storage unit stores a value of the pulse stop period measured by measurement unit for each measurement; and the microcomputer reads the value of the pulse period stored in the pulse period storage unit and the value of the pulse stop period stored in the pulse stop period storage unit, detects the header pulse signal based on the read values of the pulse period and the pulse stop period, and obtains the plurality of pieces of data based on the identified header pulse signal.

4. The information transmission apparatus according to claim 3, wherein the microcomputer reads the value of the pulse period of the header pulse signal stored in the pulse period storage unit, obtains the reference time based on the read value of the pulse period, and obtains the plurality of pieces of data based on the obtained reference time and the value of the pulse period of pulse signals following the header pulse signal stored in the pulse period storage unit.

5. The information transmission apparatus according to claim 1, wherein the transmission circuit transmits the data pulse signal as signals having the pulse period that is symmetrical with respect to a temporal center of the signal length.

6. The information transmission apparatus according to claim 2, wherein the transmission circuit transmits the data pulse signal as signals having the pulse period that is symmetrical with respect to a temporal center of the signal length.

7. The information transmission apparatus according to claim 3, wherein the transmission circuit transmits the data pulse signal as signals having the pulse period that is symmetrical with respect to a temporal center of the signal length.

8. The information transmission apparatus according to claim 4, wherein the transmission circuit transmits the data pulse signal as signals having the pulse period that is symmetrical with respect to a temporal center of the signal length.

9. The information transmission apparatus according to claim 1, wherein the reception circuit judges that disconnection with the transmission circuit occurs if state of pulse signals continues to be unchanged for a predetermined time or more.

10. The information transmission apparatus according to claim 2, wherein the reception circuit judges that disconnection with the transmission circuit occurs if state of pulse signals continues to be unchanged for a predetermined time or more.

11. The information transmission apparatus according to claim 3, wherein the reception circuit judges that disconnection with the transmission circuit occurs if state of pulse signals continues to be unchanged for a predetermined time or more.

12. The information transmission apparatus according to claim 4, wherein the reception circuit judges that disconnection with the transmission circuit occurs if state of pulse signals continues to be unchanged for a predetermined time or more.

13. The information transmission apparatus according to claim 5, wherein the reception circuit judges that disconnection with the transmission circuit occurs if state of pulse signals continues to be unchanged for a predetermined time or more.

14. The information transmission apparatus according to claim 1, wherein the plurality of pieces of data are data associated with a motor control apparatus.

15. The information transmission apparatus according to claim 2, wherein the plurality of pieces of data are data associated with a motor control apparatus.

16. The information transmission apparatus according to claim 3, wherein the plurality of pieces of data are data associated with a motor control apparatus.

17. The information transmission apparatus according to claim 4, wherein the plurality of pieces of data are data associated with a motor control apparatus.

18. The information transmission apparatus according to claim 5, wherein the plurality of pieces of data are data associated with a motor control apparatus.

19. The information transmission apparatus according to claim 9, wherein the plurality of pieces of data are data associated with a motor control apparatus.

20. The information transmission apparatus according to claim 14, wherein the plurality of pieces of data are data associated with temperature information detected by a temperature sensor of a motor control apparatus.

* * * * *